Inventor

HANS WEISBART

Attorney 3,532,482
Patented Oct. 6, 1970

3,532,482
METHOD FOR PROVIDING A GLASS FIBER MAT WITH AN EDGE THAT IS NOT SUSCEPTIBLE TO LATERAL TEARING
Hans Weisbart, Hamburg, Germany, assignor to Reichhold Chemicals, Inc., White Plains, N.Y.
Filed Sept. 9, 1966, Ser. No. 578,370
Claims priority, application Germany, Jan. 5, 1966, R 42,371, R 32,050 (utility model)
Int. Cl. C03b 23/20
U.S. Cl. 65—36    7 Claims

ABSTRACT OF THE DISCLOSURE

A process for bonding marginal edge portions of a glass fiber mat comprising randomly arranged glass fibers and including contacting glass fibers at the surface of said marginal edge portions, to reduce the tendency of said mat to tear at said marginal edge portions, which process comprises welding said glass fibers at said marginal edge portions at the contacting points thereof by applying heat and pressure to a temperature below the melting point of the glass fibers but sufficient to soften the same, while leaving the glass fibers of at least a portion of the surface of the mat adjacent said marginal edge portions unwelded.

---

The present invention relates to a method for providing a glass fiber mat, containing randomly arranged glass fibers that are held together by means of binders, with at least one edge that is not susceptible to lateral tearing, by the application of heat in the marginal area of said mat, more specifically the process comprises welding said glass fibers at said marginal edge portions at the contacting points thereof by applying heat and pressure to a temperature below the melting point of the glass fibers but sufficient to soften the same, while leaving the glass fibers of at least a portion of the surface of the mat adjacent said marginal edge portions unwelded.

In the continuous production of sheet-like mats consisting of randomly arranged single glass fibers of varying lengths which are stuck together with synthetic resin binders or with natural binders, such as starch, it is customary to cut off the irregular edges that result from the manufacturing process in order to obtain uniform widths. These cut edges have a tendency to tear as they are subjected to mechanical stresses in the course of further manipulations. There is, therefore, a decrease of the resistance, in the longitudinal direction of the mats, at the torn places.

Various attempts have been made to diminish the sensitiveness of the aforesaid mats to lateral tearing. Thus, it has been proposed in the past to apply onto or between the glass fibers that form the sheet-like mats, in the longitudinal direction thereof, for example, threads, yarns or twines made of very different materials such as glass, cotton, synthetic fibers and the like. These threads, yarns, twines and the like are combined with the sheet-like mat, with the aid of the binder, during the manufacturing process. The threads are either uniformly distributed over the entire width of the mat or are located singly or in a large number along the margin of the mat immediately adjacent to the cutting edge.

It is also known to sew or stitch threads, yarns or twines made of different materials, at uniformly spaced points, into the sheet-like mats. It has also been proposed to place the sheet-like glass fiber mat on a suitable solid supporting material such as paper, cloth or the like woven or knitted fabric and then combine the two breadths by means of adhesives, sewing or stitching. It has also been proposed in the past to use a combination of these methods for improving the susceptibility to tearing of the glass fiber mats, especially with respect to forces that affect them from the side. Another known method is that of heating the glass fibers above the melting point of the glass, by the direct action of high temperatures produced by gas flames, and thereby melt them together. However, this method has the drawback that the notoriously high resistance of glass fibers is greatly reduced by the melting operation.

The primary object of the present invention is to provide a superior glass fiber mat. This object is attained by employing in the manufacture of these mats very simple means for arriving at a product wherein its mechanical properties in the marginal areas are fully retained and which, for all practical purposes, is no longer susceptible to lateral tearing. This problem has been solved by a method whereby at least the glass fibers located at the surface in sufficient number, are stuck together by glass-to-glass bonding at the contacting points thereof by pressure preferably applied by means of heated rollers.

The term "sufficient number" of glass fibers held together by glass-to-glass bonding as used herein is intended to include within its meaning at least 10% of the glass fibers in the marginal areas being treated.

The improved glass fiber mats of the present invention display, in this connection, important advantages over known glass fiber mats. They can also be manufactured in a very simple manner. In order to avoid any lowering of the resistance of the glass fibers undergoing melting, it is recommended to use metal rollers for treating the edge of the glass fiber mat that is to form the desired reinforced marginal zone of the mat, the width of the rollers being chosen to fit the zone that is to be reinforced. The rollers are heated to a temperature that is not high enough to melt the glass fibers contained in the edge of the glass fiber mat passing through the rollers, but sufficiently high to soften them so that they remain firmly bonded together after leaving the rollers.

Particularly useful in this connection are rollers made of noble metal. However, it is possible to also use other metals without any detrimental effects. The heating of the rollers can be effected by direct heating and, more particularly, by means of heated air or by electrical resistance heating. By keeping the rollers at an even temperature below the melting point of the glass undergoing treatment, it is possible to avoid any lowering of the resistance of the glass fibers by too vigorous heating, i.e. at temperatures above their melting point. The efficiency of the operation is enhanced by the pressure of the rollers upon the edge of the glass fiber mat. Glass fiber mats having a thickness of 0.2 to 1.5 mm. can be treated in accordance with the above-described method. However, it is preferred to use glass fiber mats having a thickness of 0.3 to 0.8 mm. The glass used for the preparation of the glass fiber mat should preferably have a transformation temperature from 300 to 700° C. However, as a general rule, it is preferred to use a glass having a transformation temperature from 400 to 600° C.

The novel aspects of the mat and the procedure followed in the production thereof, are shown in the accompanying drawings.

Figure 1:
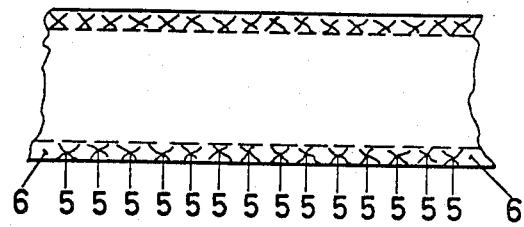
FIG. 1 shows a glass fiber mat 1 displaying on one of its sides, in the marginal zone thereof, the glass-to-glass bond at the contacting points of the glass fibers, as indicated by the numeral 5.
Figure 2:
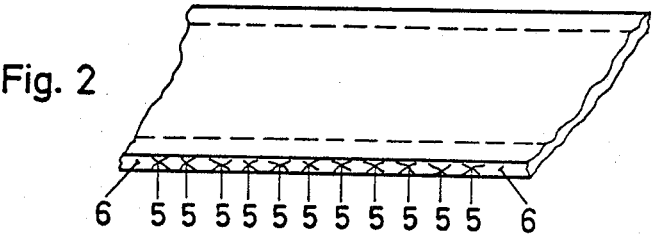
FIG. 2 shows a glass fiber mat wherein, particularly in the marginal zone, there is a layer of glass fibers that are stuck together at their points of contact. The marginal zone was given the reference numeral 6 in each of the figures.
Figure 3:
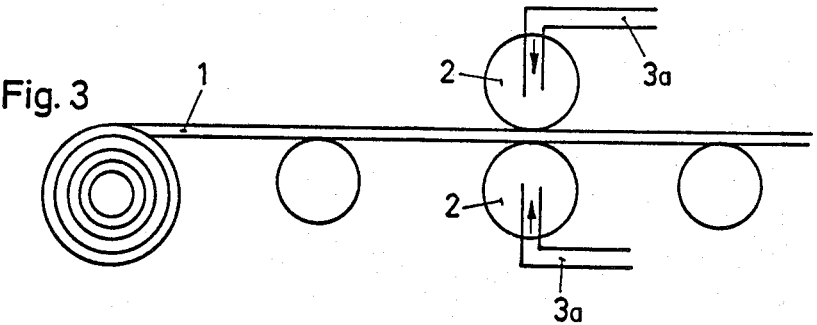

FIG. 3 illustrates the manufacture of the glass fiber mat of the present invention, whereby the glass fiber mat 1 is advanced between two metal cylinders; these are provided in the form of rollers 2 that are heated by hot air 3a at a temperature capable of just softening the glass of the glass fiber mat undergoing treatment. In the arrangement shown, the heated cylindrical metal rollers continuously press against the glass fiber mat, whereby the glass of the glass fiber mat is heated just enough to permit them, by the pressure applied, to adhere to one another at the contacting points.

The marginal zone, wherein this particular glass-to-glass bonding is effected, has a width that is about 1/30 to 1/10 of the total width. However, it is preferred to subject 1/20 of the total width on both sides of the mat to such bonding.

According to a further embodiment of the present invention, it is possible to provide additional reinforcing areas on the surface between said marginal zones, preferably arranged in the form of strips disposed in the longitudinal and/or transverse direction of the mat, whereby at least the glass fibers that are located at the surface in said additional area or areas are held together by glass-to-glass bonding. These bonded areas arranged in the form of strips in the longitudinal and/or transverse direction of the mat, permit dividing the finished article into separate sections or units, in such a way that the new edges provided in this manner are also, like the other edges, not susceptible to tearing.

This alternate method of proceeding in accordance with the present invention, can be carried out in the manner already described. It is merely necessary to provide additional pairs of heated metal rollers that are capable of carrying out the required heat and pressure treatment in the longitudinal and transverse direction of the glass fiber mat.

Figure 4:
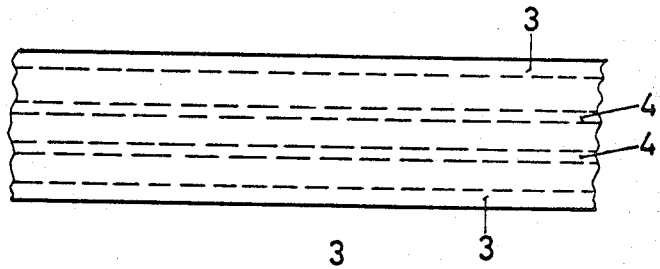

FIG. 4 shows a further embodiment of the present invention wherein the glass fiber mat 1, in addition to having a marginal zone 3, is provided with further zones 4, arranged in the longitudinal direction of the mat, in which the glass fibers located at the surface are held together by glass-to-glass bonding.

Figure 5:
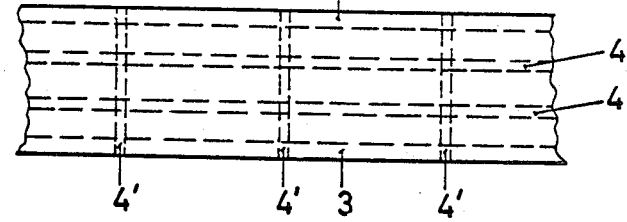

FIG. 5 shows another embodiment according to FIG. 4, with the difference, however, that in this case there are also provided superficial glass-to-glass bonds arranged in the form of strips extending in the transverse direction of the glass fiber mat.

The glass fiber mats shown in the drawings are composed of glass fibers having varying lengths, for example, between 20 and 300 cm.

I claim:
1. A process for bonding at least one marginal edge portion of a glass fiber mate comprising randomly arranged glass fibers and including contacting glass fibers at the surface of said marginal edge portion, to reduce the tendency of said mat to tear at said marginal edge portion, which process comprises welding said glass fibers at said marginal edge portion at the contacting points thereof by applying heat and pressure to a temperature below the melting point of the glass fibers but sufficient to soften the same, while leaving the glass fibers of at least a portion of the surface of the mat adjacent said marginal edge portion unwelded.

2. The process according to claim 1 wherein the welding of the fibers at said marginal edge portion is accomplished by application of heated metal rollers at the marginal edge portions.

3. The process according to claim 1 wherein at least 10% of the glass fibers arranged in said marginal edge portion are held together by glass to glass bonding.

4. The process according to claim 1 wherein said glass fiber mat further includes a binder.

5. A process according to claim 1 further including the step of subjecting at least one zone in addition to said marginal edge portion to said step of welding while still leaving the glass fibers of at least a portion of the surface of the mat adjacent said zone unwelded.

6. A process according to claim 5 wherein said zone extends substantially parallel to said marginal edge portion.

7. A process according to claim 5 wherein said zone extends transversely of said marginal edge portion.

References Cited
UNITED STATES PATENTS

| | | | |
|---|---|---|---|
| 2,344,601 | 3/1944 | Collins | 161—150 X |
| 3,328,142 | 6/1967 | Levecque | 65—9 X |
| 2,700,633 | 1/1955 | Bovenkerk | 65—36 X |
| 3,413,181 | 11/1968 | Goldhammer et al. | 161—126 X |

S. LEON BASHORE, Primary Examiner

J. B. HARDAWAY, Assistant Examiner

U.S. Cl. X.R.

65—4; 156—62.6; 161—86, 149, 150